(12) United States Patent
Polehn et al.

(10) Patent No.: US 10,123,202 B1
(45) Date of Patent: Nov. 6, 2018

(54) SYSTEM AND METHOD FOR VIRTUAL SIM CARD

(71) Applicant: Verizon Patent and Licensing Inc., Arlington, VA (US)

(72) Inventors: Donna L. Polehn, Kirkland, WA (US); Patricia R. Chang, San Ramon, CA (US); Fred Weisbrod, Renton, WA (US); Corey J. Christopherson, Bainbridge Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/646,201

(22) Filed: Jul. 11, 2017

(51) Int. Cl.
*H04W 12/06* (2009.01)
*H04W 8/18* (2009.01)
*H04B 1/3816* (2015.01)

(52) U.S. Cl.
CPC .......... *H04W 8/183* (2013.01); *H04B 1/3816* (2013.01); *H04W 12/06* (2013.01)

(58) Field of Classification Search
CPC ..... H04W 48/18; H04W 8/183; H04W 76/02; H04W 12/06; H04W 48/04; H04B 1/3816; H04B 1/3827; G06C 20/102
See application file for complete search history.

(56) References Cited

U.S. PATENT DOCUMENTS

| | | | | |
|---|---|---|---|---|
| 2009/0163175 A1* | 6/2009 | Shi | .......... | H04W 8/205 455/411 |
| 2010/0311468 A1* | 12/2010 | Shi | .......... | H04W 4/001 455/558 |
| 2017/0046664 A1* | 2/2017 | Haldenby | .......... | G06Q 20/102 |

* cited by examiner

*Primary Examiner* — Thanh Le

(57) ABSTRACT

A method is provided for using virtual subscriber identity modules (vSIMs) for client devices. A network device creates, in a memory, a user account for storing one or more vSIMs. The network device receives, from a user of the user account, a selection of network services to be associated with a vSIM. The network device initiates creation of a blockchain including a vSIM certificate for the network services, wherein the vSIM certificate includes an International Mobile Subscriber Identity (IMSI). The network device associates the vSIM certificate with the user account. The vSIM can be retrieved and used by any one of different devices associated with the user account or loaned to other users.

20 Claims, 9 Drawing Sheets

SYSTEM AND METHOD FOR VIRTUAL SIM CARD

BACKGROUND

Subscriber identity module (SIM) cards typically are individually formatted with a service provider's authentication credentials, an International Mobile Subscriber Identity (IMSI), an integrated circuit card identifier (ICCID), etc. in secured vendor factories as part of the manufacturing process. For devices that are branded for a specific wireless service provider, the SIM card is usually pre-inserted into a device at the original equipment manufacturer (OEM) facility or it may also be inserted at time of sale.

DETAILED DESCRIPTION OF PREFERRED EMBODIMENTS

The following detailed description refers to the accompanying drawings. The same reference numbers in different drawings may identify the same or similar elements.

According to implementations described herein, blockchain encryption technology is applied to subscriber identity modules (SIM). Using blockchain encryption technology, a traditional physical SIM card is replaced with a software SIM version (referred to herein as a "virtual SIM" or "vSIM") that is secure. Only one copy of the vSIM can exist on any one device at a time. A vSIM platform for the wireless service provider performs the primary functions of implementing a user repository of vSIMs via a set of application programming interfaces (APIs). In one implementation, users can accept new vSIM certificates into a user account, transfer a vSIM among client devices associated with the user account, or deliver a vSIM certificate to another user.

According to one implementation, a method is provided for using vSIMs for client devices. A network device creates, in a memory, a user account for storing one or more vSIMs. The network device receives, from a user of the user account, a selection of network services to be associated with a vSIM. The network device initiates creation of a blockchain including a vSIM certificate for the network services, wherein the vSIM certificate includes an International Mobile Subscriber Identity (IMSI). The network device associates the vSIM certificate with the user account (e.g., for eventual selection by a client device). The vSIM can be retrieved and used by any one of different devices associated with the user account, transferred between devices associated with the same user account, or temporarily assigned to other users.

Figure 1:
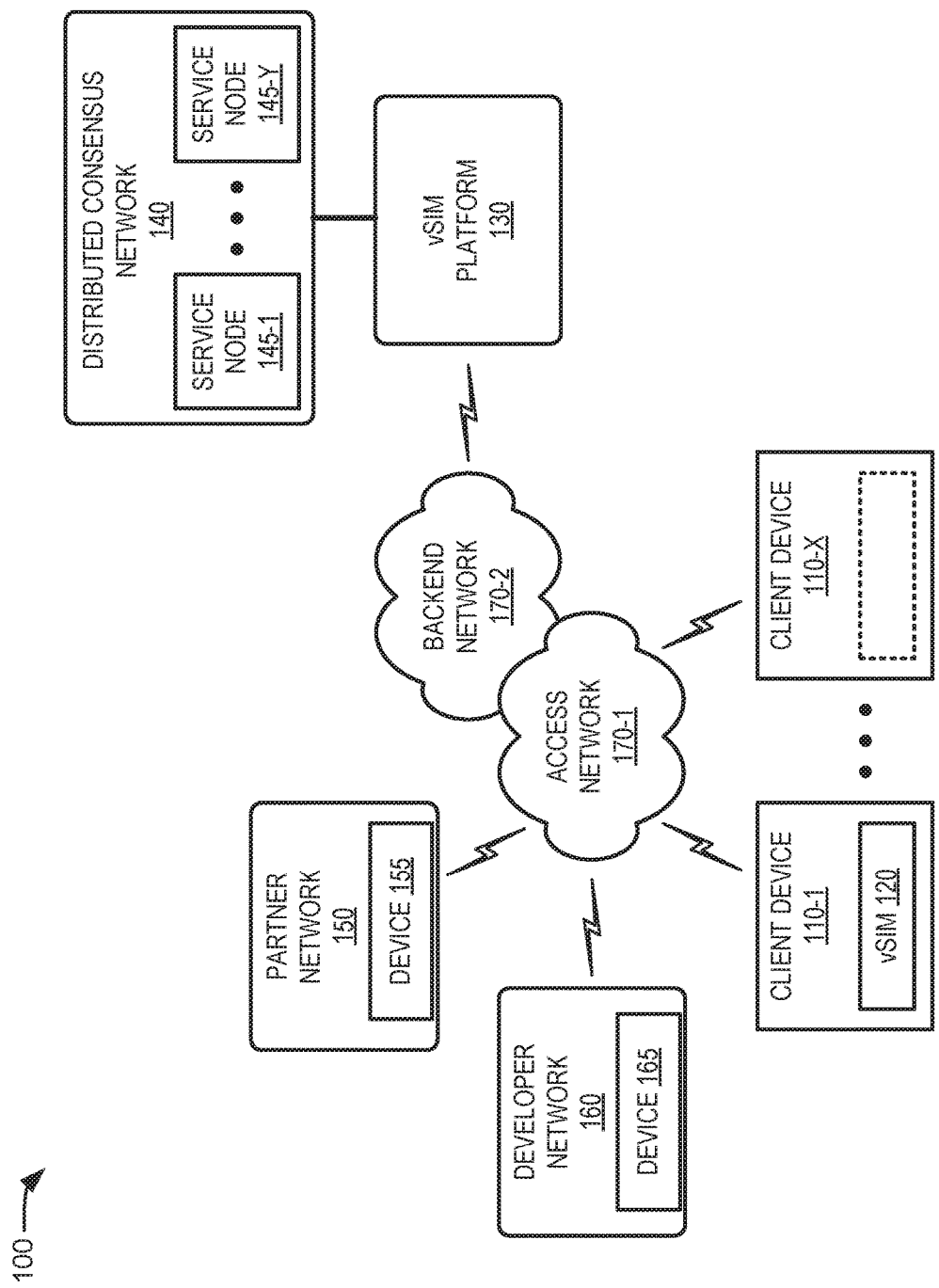
FIG. 1 is a diagram illustrating an exemplary network environment in which systems and/or methods described herein may be implemented.

FIG. 1 is a diagram illustrating an exemplary network environment 100 in which systems and methods described herein may be implemented. As illustrated, network environment 100 may include client devices 110-1 through 110-X (referred to herein collectively as client devices 110 or individually as client device 110), a vSIM platform 130, a distributed consensus network 140, a partner network 150, a developer network 160, and a communications network 170. Communications network 170 may include an access network 170-1 and a backend network 170-2. According to one implementation, client devices 110-1 through 110-X may share a virtual SIM 120.

Network environment 100 may be implemented to include wireless and/or wired (e.g., electrical, optical, etc.) links. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links illustrated in network environment 100 are exemplary. For purposes of description, devices and/or nodes of vSIM platform 130, distributed consensus network 140, partner network 150, developer network 160, and communications network 170 may be referred to as network elements within network environment 100.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device). The number of network elements, the number of networks, and the arrangement in network environment 100 are exemplary. According to other embodiments, network environment 100 may include additional network elements, fewer network elements, and/or differently arranged network elements, than those illustrated in FIG. 1. For example, there may be numerous partner networks 150, developer networks 160, and so forth. In other embodiments, one network in network environment 100 may be combined with another network.

Client device 110 may include a connected device or computing device operated by a user or on behalf of a user. Client device 110 may include any mobile communication device configured to communicate with a base station (e.g., for access network 170-1) via wireless signals. For example, client device 110 may include a portable communication device (e.g., a mobile phone, a smart phone, a global positioning system (GPS) device, and/or another type of wireless device); a telephone terminal; a personal computer or workstation; a server device; a laptop, tablet, or another type of portable computer; a media playing device; a portable gaming system; a machine-type communication (MTC) device; an Internet-of-Things device; and/or any type of mobile device with wireless communication capability.

According to an implementation, client device 110 may include a vSIM client application to request and/or implement a vSIM 120 from vSIM platform 130. The client application may use one or more APIs to communicate with vSIM platform 130 to obtain a vSIM 120 for activation on network 170. In one implementation, only one client device 110 may use vSIM 120 at a time. In one implementation, a vSIM 120 certificate may be stored locally on a client device 110 (e.g., client device 110-1 in FIG. 1) to the exclusion of other client devices. In one implementation, client device 110 may include no physical SIM card. In other implementations, client device 110 may include a physical SIM that may be temporarily replaced with a vSIM.

vSIM platform 130 may include network devices and/or server devices to respond to API calls from client devices 110 and other devices (e.g., devices in partner network 150 and developer network 160). An API may use a collection of functions and procedures, referred to as API calls, that can be executed by other applications. For example, as described further herein, vSIM platform 130 may receive API calls from a client application (e.g., an application residing on client device 110) and initiate one or more vSIM services performed by service nodes 145 in distributed consensus network 140. In one implementation, vSIM platform 130 may include logic that allows for validating an API call from client device 110 before performing the vSIM service associated with the API call. vSIM platform 130 is described further in connection with FIG. 4.

Distributed consensus network 140, may include network devices—referred to herein as service nodes 145—that participate in validation of vSIM entries. In one implementation, distributed consensus network 140 may include all or a subset of service nodes 145. In another implementation, distributed consensus network 140 may include nodes (not shown) other than service nodes 145. For example, multiple servers or proxy nodes running in cloud or edge computing clusters/farms can be leveraged as part of distributed consensus network 140 to reduce a burden on service nodes 145.

Each participating service node 145 in distributed consensus network 140 maintains a continuously-growing list of records referred to herein as a vSIM blockchain (or simply a blockchain) which is secured from tampering and revision as described below. Any updates from vSIM platform 130 (or another trusted node) will be added into the vSIM blockchain. Each version of the vSIM blockchain may include a timestamp and a link to a previous version of the blockchain. Each authorized transaction is added in chronological order to the vSIM blockchain, and the vSIM blockchain is presented to each of participating nodes in distributed consensus network 140 as a cryptographically secured block. Each entry of the vSIM blockchain may be considered a node in a hash tree structure for efficiency. This hash tree ensures that blocks received from vSIM platform 130 (or another trusted node) are received undamaged and unaltered, and enables distributed consensus network 140 to verify that the other nodes in distributed consensus network 140 do not have fraudulent or inaccurate blocks in the vSIM blockchain.

Partner network 150 may include network devices and/or server devices, such as device 155, to support payment and service options associated with use of vSIMs on client devices 110. For example, vSIM platform 130 may use APIs to enlist services from partner network 150.

Developer network 160 may include network devices and/or server devices, such as device 165, to create software and/or services for vSIM use. For example, developer network 160 may register with vSIM platform to create and offer applications for monitoring vSIM use, optimizing sharing of vSIMs, etc. In one implementation, vSIM platform 130 may provide application modules, templates, services, and the like for developers to create and monitor services that utilize vSIMs.

Communication network 170 may include a plurality of networks of any type, and may be broadly grouped into one or more access networks 170-1 and one or more backend networks 170-2. Access network 170-1 provides connectivity between client device 110 and other network elements within access network 170-1 and/or backend network 170-2. According to an exemplary implementation, access network 170-1 includes a radio access network (RAN). The RAN may be a Third Generation (3G) RAN, a Fourth Generation (4G) RAN, a 5G RAN, a future generation wireless network architecture, etc. By way of further example, access network 170-1 may include an Evolved UMTS Terrestrial Radio Access Network (E-UTRAN) of a Long Term Evolution (LTE) network or LTE-Advanced (LTE-A) network. Depending on the implementation, access network 170-1 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. In aspects where access network includes a RAN, devices (e.g., client devices 110) may require activation by a service provider to use access network 170-1.

Backend network 170-2 may exchange data with access network 170-1 to provide client device 110 with connectivity to various servers, gateways, and other network entities, which may include one or more devices in vSIM platform 130. Backend network 170-2 may include a wide area network (WAN), a metropolitan area network (MAN), an intranet, the Internet, a wireless satellite network, a cable network (e.g., an optical cable network), etc.

Figure 2:
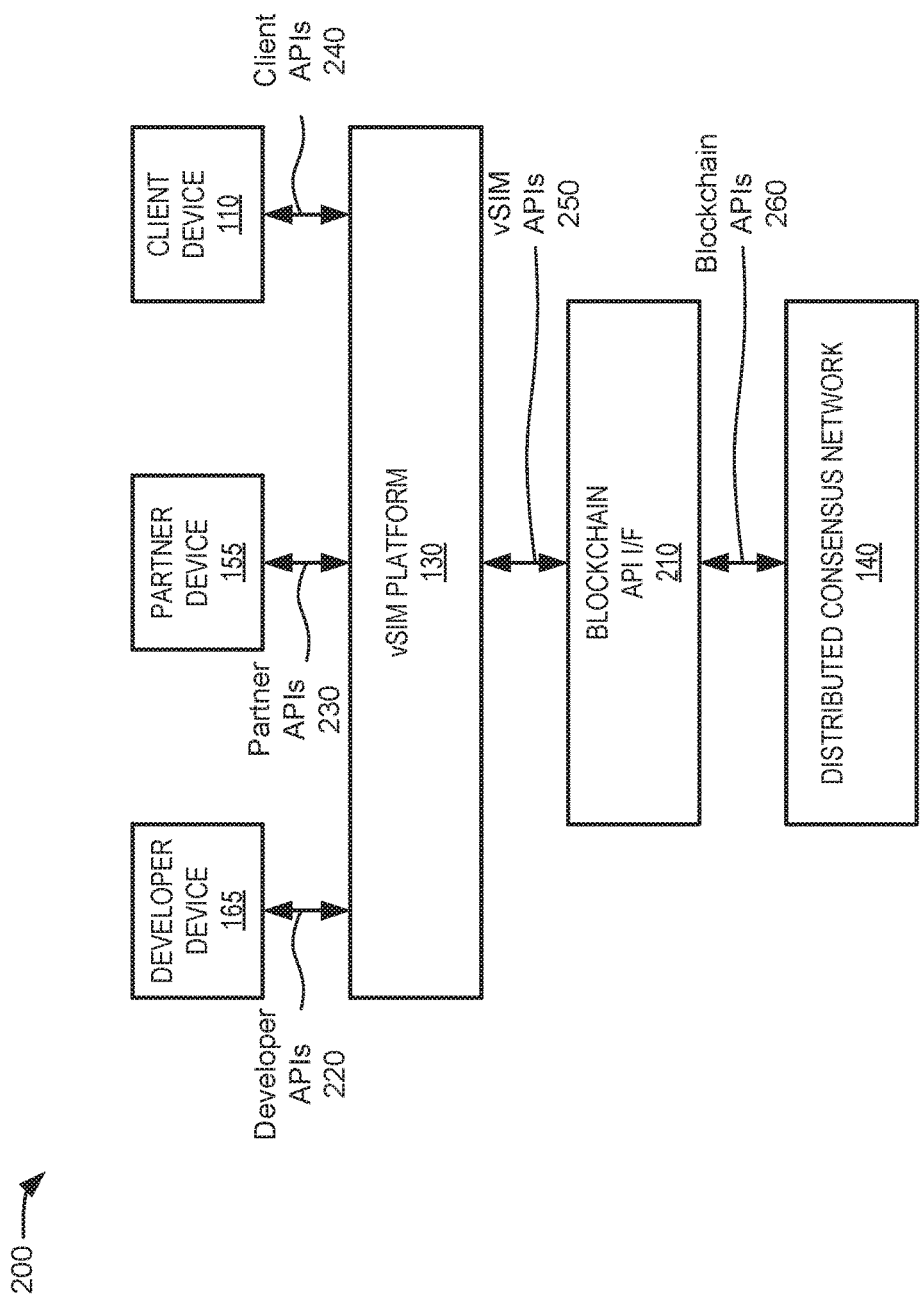
FIG. 2 is a diagram illustrating exemplary communications in a portion of the network environment of FIG. 1.

FIG. 2 is a diagram illustrating exemplary communications in a portion 200 of network environment 100. As shown in FIG. 2, network portion 200 may include client device 110, vSIM platform 130, distributed consensus network 140, blockchain API interface (I/F) 210, partner device 155, and developer device 165.

Developer device 165 may register with vSIM platform 130 using secure credentials and use developer APIs 220 to obtain API formats for applications implementing vSIM. For example, vSIM platform 130 may include a library of API commands that may be used by developers to configure applications for managing, transferring, and allocating vSIMs.

Partner device 155 may register with vSIM platform 130 and receive API calls for services, via partner APIs 230 to support vSIM activations.

Client device 110 may register with vSIM platform 130 to obtain authentication codes and/or private keys. Client device 110 may use client APIs to request and transfer vSIMs. In one implementation, client device 110 may send a request using client API 240 to vSIM platform 130 for a service. The request may use, for example, an API call for the particular vSIM service. The API call may cause vSIM platform 130 to initiate a blockchain activity in distributed consensus network 140.

vSIM platform 130 may implement several types of functions using APIs, including generally vSIM fulfillment and vSIM blockchain leasing. APIs for vSIM fulfillment may ensure (1) a wireless network provider securely receives transactions and vSIM request and (2) the wireless network provider securely delivers vSIM blockchains to a vSIM user account. APIs for vSIM blockchain leasing may enable (1) a client device or user to initiate allocation of a vSIM block to the client device and (2) a client device or user to release a vSIM from an allocation when the user decides to move the vSIM to another client device. In one implementation, a vSIM block may be allocated for a preconfigured time period, such as a subscription period. In another implementation, a vSIM allocation may include a selected timeout period for a particular device from a pool of devices that could share a vSIM. In such cases, the vSIM block may include, for example, a time or duration field that can signal when a vSIM block expires.

API calls from developer APIs 220, partner APIs 230, and/or client APIs 240 may cause vSIM platform 130 to initiate backend API via blockchain API interface 210. In one implementation, a single API call from vSIM platform 130 may cause blockchain API interface 210 to generate multiple API calls for distributed consensus network 140. Execution of API calls may, for example, result in execution of a set of blockchain function(s).

Figure 3:
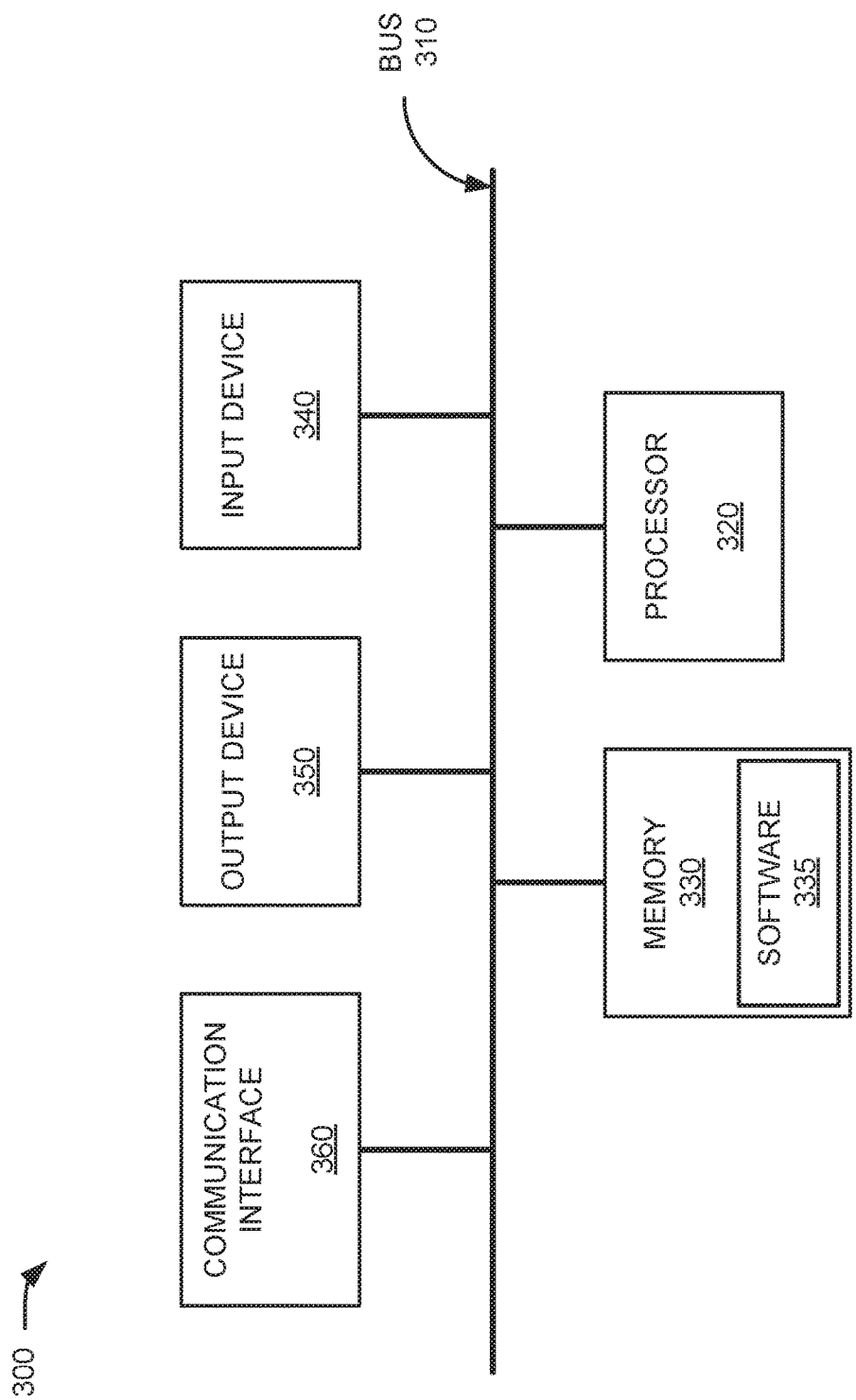
FIG. 3 is a block diagram illustrating exemplary components of a device that may correspond to one of the devices of FIG. 1.

FIG. 3 is a diagram illustrating exemplary components of a device 300, according to an implementation described herein. Each of client device 110, service node 145, partner device 155, developer device 165, and devices in vSIM platform 130 may be implemented as a combination of hardware and software on one or more of device 300. As shown in FIG. 3, device 300 may include a bus 310, a processor 320, a memory 330, an input component 340, an output component 350, a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Software 335 includes an application or a program that provides a function and/or a process. Software 335 is also intended to include firmware, middleware, microcode, hardware description language (HDL), and/or other form of instruction. By way of example, when device 300 is a client device 110, software 335 may include a vSIM client application to request, store, and/or implement a vSIM certificate.

Input component 340 may include a mechanism that permits a user to input information to device 300, such as a keyboard, a keypad, a button, a switch, touch screen, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. For example, when device 300 is a primary device 150, communication interface 360 may receive local RF signals over the air from, and transmit RF signals over the air to, companion device 140. In one implementation, for example, communication interface 360 may communicate with a network and/or devices connected to a network. For example, when device 300 is a companion device 140, communication interface 360 may communicate with peripheral devices (such as push button, thermal sensor, etc.) to receive activity event or collect data. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions (e.g., software 335) contained in a computer-readable medium, such as memory 330. A computer-readable medium may be defined as a non-transitory memory device. A non-transitory memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. As another example, device 300 may include one or more switch fabrics instead of, or in addition to, bus 310. Additionally, or alternatively, one or more components of device 300 may perform one or more tasks described as being performed by one or more other components of device 300.

Figure 4:
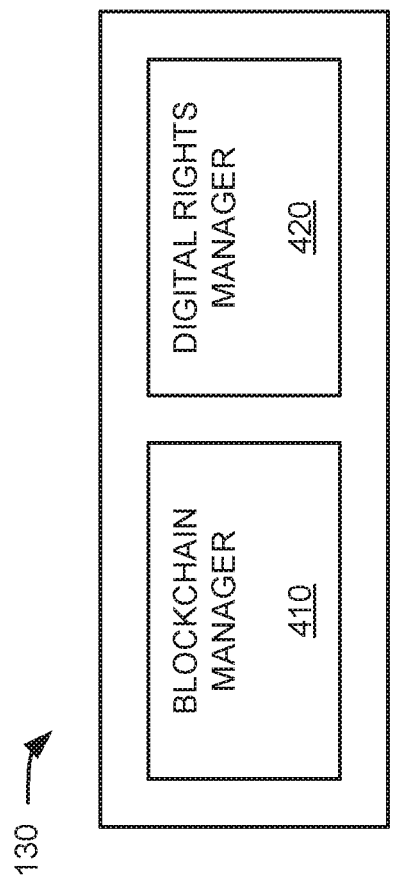
FIG. 4 is a diagram of exemplary functional components of the virtual SIM (vSIM) platform of FIG. 1.

FIG. 4 is a diagram of functional components of vSIM platform 130. The functional components of FIG. 4 may be implemented, for example, by processor 320 in conjunction with memory 330/software 335. As shown in FIG. 4, vSIM platform 130 may include a blockchain manager 410 and a digital rights manager 420.

Blockchain manager 410 may authorize access for vSIMs, manage vSIM user accounts, and provide administrative functions, such as tracking vSIM activity. Blockchain manager 410 is described further in connection with FIG. 5.

Figure 5:
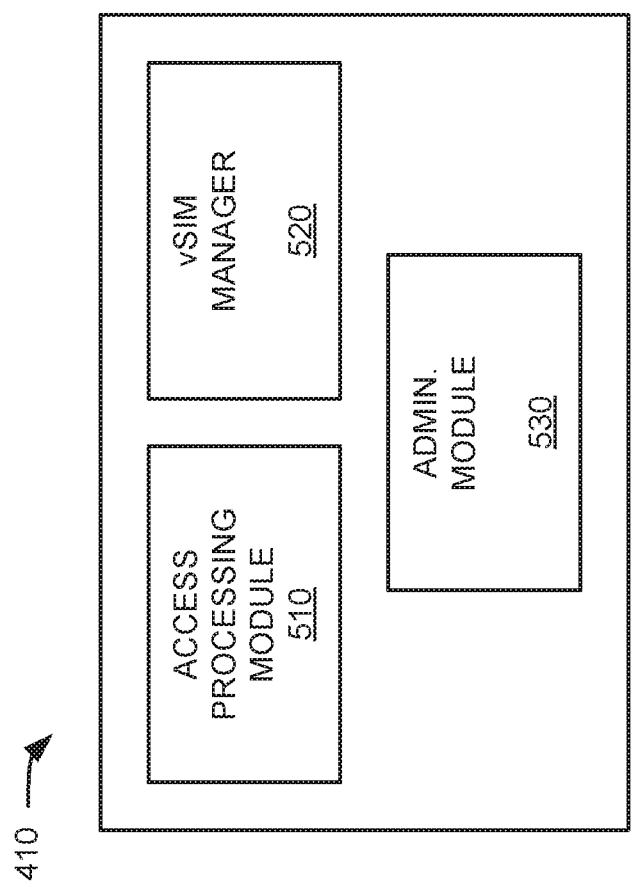
FIG. 5 is a diagram of exemplary functional components of the blockchain manager of FIG. 4.

FIG. 5 is a diagram of functional components of blockchain manager 410. As shown in FIG. 5, blockchain manager 410 may include access processing module 510, vSIM manager 520, and administrative module 530.

Access processing module 510 may support account-based or third-party-based billing for vSIM use. Generally, access processing module 510 may confirm a vehicle is in place for charging and accept payments (if needed) before approving block fulfillment (e.g., creation of a new block in a vSIM certificate blockchain for distributed consensus network 140). In one implementation, payments for vSIM services may be included as part of an account with a service provider. In another implementation, vSIM services may be provided through a sharing/rental plan or a per-transfer plan. For example, access processing module 510 may implement an on-line payment system (e.g., credit card payments, electronic funds transfer, on-line payment services, etc.) before authorizing a new block for a vSIM transfer. Access processing module 510 may also account for exchange rates of different denominations for international transactions (such as when a user uses a vSIM for overseas travel).

vSIM manager 520 may provide an interface for users to view, track, transfer, and manage vSIMs. In one implementation, a vSIM may be associated with a particular user of multiple devices. In another implementation, a vSIM may be associated with an account including multiple users of multiple devices. A vSIM user account may include a record of vSIMs available to a user and a record of which vSIM may be currently assigned to a client device 110. In one implementation, a vSIM user account may be associated with a user and track vSIM activity for that user.

vSIM manager 520 may use a user-facing API to create a vSIM user account for a user of a vSIM. vSIM manager 520 may provide a block store containing encrypted vSIM certificate. vSIM manager 520 may provide a vehicle for a user to send a vSIM to other users and receive payment/credit in return. For example, a user may lend a vSIM to another user for a pre-defined period in exchange for credits, fees, etc. that may be managed by access processing module 510.

Administrative module 530 may provide activity monitoring for vSIMs. For example, administrative module 530 may log use time of vSIMs per device, data usage per vSIM and per device, etc. Administrative module 530 may also provide other administrative functions, such as profile settings, use restrictions, automatic vSIM transfers, and other user configurable settings for vSIM use.

Referring again to FIG. 4, digital rights manager 420 may validate and/or enforce use of vSIM certificates. In implementations described herein, digital rights manager 420 may generate (e.g., in conjunction with distributed consensus network 140) vSIM certificates that are encoded using blockchain encryption techniques. A vSIM certificate may include an International Mobile Subscriber Identity (IMSI) number and its related authentication key (e.g., a blockchain ID), which are used to identify and authenticate subscribers. A vSIM may be generated for a new vSIM user account. In one implementation, a vSIM may be transferred between devices associated with a user. In another implementation, a vSIM may be associated with multiple users/user devices and shared (e.g., at different times) by transferring the vSIM among different devices. For each vSIM transfer, a new vSIM certificate may be generated (e.g., while including the same IMSI).

Digital rights manager 420 may authenticate a user of client device 110 and/or the particular client device 110. For example, digital rights manager 420 may store user credentials and may request/receive login information (e.g., authentication codes, passcodes, etc.) associated with the user and compare the login information with the stored credentials to authenticate the user. Additionally, or alternatively, digital rights manager 420 may request/receive device information (e.g., a unique device identifier) associated with client device 110 and may compare the device information with stored information to authenticate client device 110. In one implementation, digital right manager may verify authentication whenever a client device 110 or user attempts to create a vSIM user account, obtain a vSIM, and/or transfer a vSIM.

Figure 6:
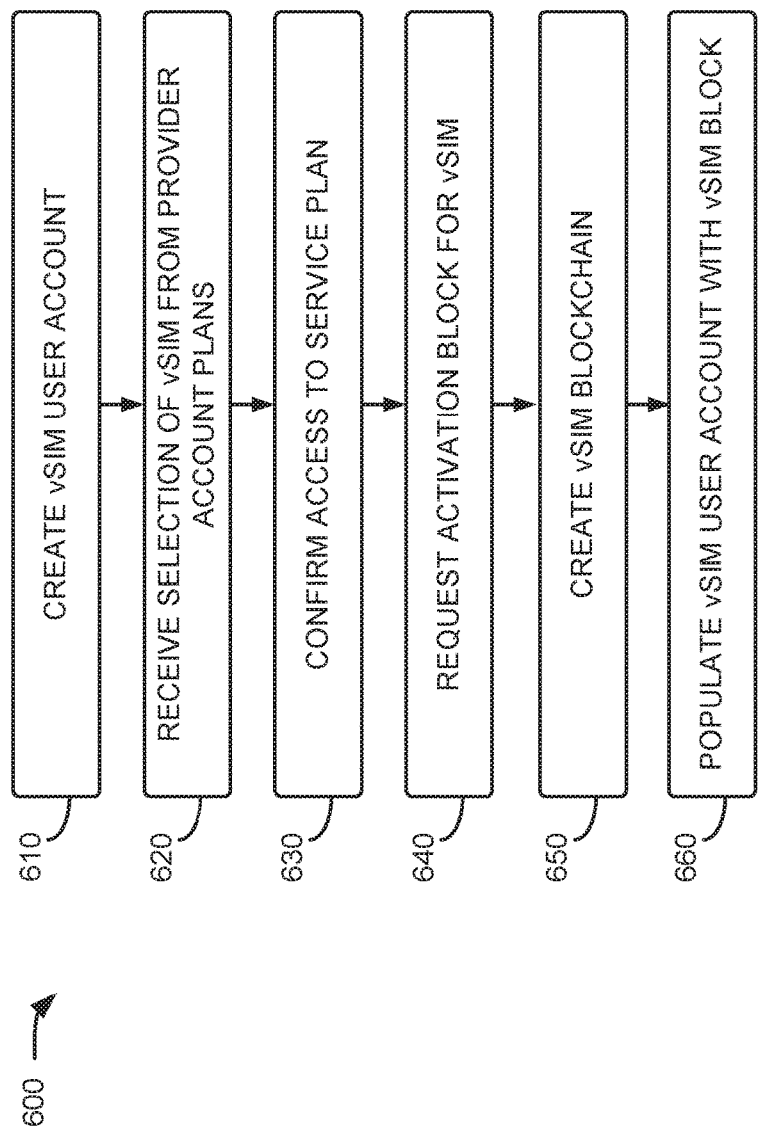
FIG. 6 is a flow diagram illustrating an exemplary process for creating a vSIM user account, according to an implementation described herein.

FIG. 6 is a flow diagram illustrating an exemplary process 600 for creating a vSIM user account. Process 600 may instantiate the vSIM and a vSIM user account containing the vSIM(s) blockchain. In one implementation, process 600 may be performed by vSIM platform 130. In another implementation, process 600 may be performed by vSIM platform 130 in conjunction with distributed consensus network 140 and blockchain API interface 210.

Process 600 may include creating a vSIM user account (block 610) and selecting a vSIM from a provider's account plans (block 620). For example, a user of client device 110 may create a vSIM user account using a portal mechanism for vSIM platform 130. For example, client device 110 may access a web interface for vSIM platform 130 via a local LAN (e.g., using WI-FI, BLUETOOTH, etc.). In another implementation, a vSIM user account may be created for a user by a service provider representative using a telephone support system. The vSIM user account may include, for example, a user identifier, account identifier, eligible devices, etc. associated with the user. An authentication code selected by the user (e.g., passcode or another form of authentication) may be associated with the vSIM user account and stored to verify future vSIM access requests. The vSIM user account may be stored, for example, in a memory (e.g., memory 330) associated with vSIM platform 130. The vSIM user account, once created, may be populated with one or more vSIMs selected by the account holder (which may be the user in some instances). Each vSIM may include an account plan, including a list of services to which the vSIM can provide access. A user may use the web interface (or another interface) to select one or more service plans and associated vSIMs to be made available in the vSIM. In one implementation, the vSIM user account may include different vSIMs for different service providers (e.g., different wireless carriers). The user's vSIM user account can then allocate or assign a vSIM certificate to client device 110 (e.g., a phone, a vehicle, or another device) to enable use of the vSIM. Only "X" allocation(s) at time can be issued, where "X" is defined by the wireless carrier, typically 1, although more are possible.

Process 600 may also include confirming access to a service plan (block 630) and requesting an activation block for the vSIM (block 640). For example, vSIM platform 130 may receive the vSIM selection and may confirm authorized access to the vSIM. In one implementation, the vSIM may be added to a service plan for the user (e.g., as part of a periodic billing plan, such as a monthly service plan). Using an access vSIM API, vSIM platform 130 may submit a request to blockchain API interface 210 to generate an activation block for the new vSIM. In one implementation, the activation block may be the first block in a blockchain for the new vSIM.

Process 600 may further include creating the vSIM blockchain (block 650). For example, in response to the request from vSIM platform 130, blockchain API interface 210 may generate an API call (or other instructions) to distributed consensus network 140 to create a blockchain for the vSIM. Participating service nodes 145 in distributed consensus network 140 may implement blockchain protocols to perform a blockchain activity responsive to the requests from API interface 210. Blockchain activity may include, for example, registering a transaction in distributed consensus network 140, performing block processing (e.g., grouping one or more transactions into blocks) and other operations needed for verification and record-keeping.

Process 600 may additionally include, following creation of the vSIM blockchain, populating the user's vSIM user account with the vSIM block (block 660). For example, the activation block representing the vSIM may be provided to vSIM platform 130 and assigned to a user's vSIM user account. Although assigned to a vSIM user account the vSIM is not linked to any particular device. Once the vSIM is placed in the user's vSIM user account, the use rights are available for transfer to a wireless device (e.g., one of client devices 110). By way of comparison, assignment of the vSIM to a vSIM user account is similar to a having a physical SIM card in possession of the user, ready to be inserted into a device. However, the vSIM is inserted virtually, as described further in connection with FIG. 7.

Figure 7:
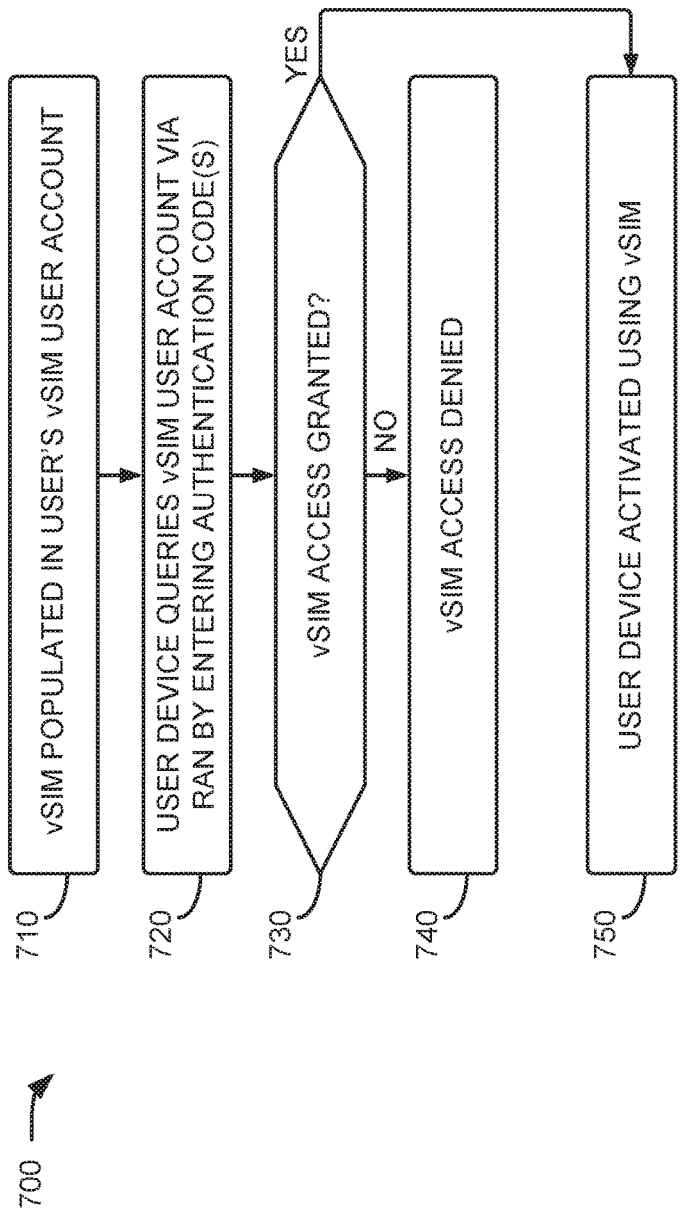
FIG. 7 is a flow diagram illustrating an exemplary process for accessing a vSIM via a client device, according to an implementation described herein.

FIG. 7 is a flow diagram illustrating an exemplary process 700 for accessing a vSIM via a client device. Process 700 allows the vSIM to enable a client device 110 to be used on network 170 associated with the user's account. In one implementation, process 700 may be performed by vSIM platform 130. In another implementation, process 700 may be performed by vSIM platform 130 in conjunction with client device 110.

Process 700 may include populating a vSIM in a user's vSIM user account (block 710) and receiving a vSIM access request from a client device (block 720). For example, as described above in connection with FIG. 6, a vSIM activation block may be generated and added to a user's vSIM user account stored in vSIM platform 130. Client device 110 may use a RAN (e.g., access network 170-1) to send an access request (e.g., an API call) to vSIM platform 130 requesting a vSIM. In one implementation, client device 110 may use a Non-Access Stratum (NAS) control channel to send the API call. The API call may identify an account identifier or device identifier that may associate the request with the user's vSIM user account. In one implementation, as part of the API call, client device 110 may provide an authentication code (e.g., passcode, etc.) solicited from user input or stored in a local memory (e.g., memory 330) of client device 110.

Process 700 may include determining if access to the vSIM is granted (block 730). For example, vSIM platform 130 may receive the API call and the authentication codes from client device 110. vSIM platform 130 may compare the authentication code received from client device 110 with the previously stored authentication code (e.g., credentials stored with digital rights manager 420).

If access to the vSIM is not granted (block 730-NO), vSIM platform 130 denies access to the vSIM (block 740). For example, if the authentication code received from client device 110 does not match the authentication code stored by vSIM platform 130, then vSIM platform 130 may deny access to client device 110.

If access to the vSIM is granted (block 730—YES), the client device is activated using the vSIM (block 750). For example, if the authentication code received from client device 110 matches the authentication code stored by vSIM platform 130, then vSIM platform 130 may transfer use rights, as detailed in the vSIM, to client device 110. In one implementation, a vSIM block identifier may be provided to client device 110. Thus, client device 110 may temporarily store a SIM profile, including an IMSI, while vSIM 120 is valid on client device 110.

Figure 8:
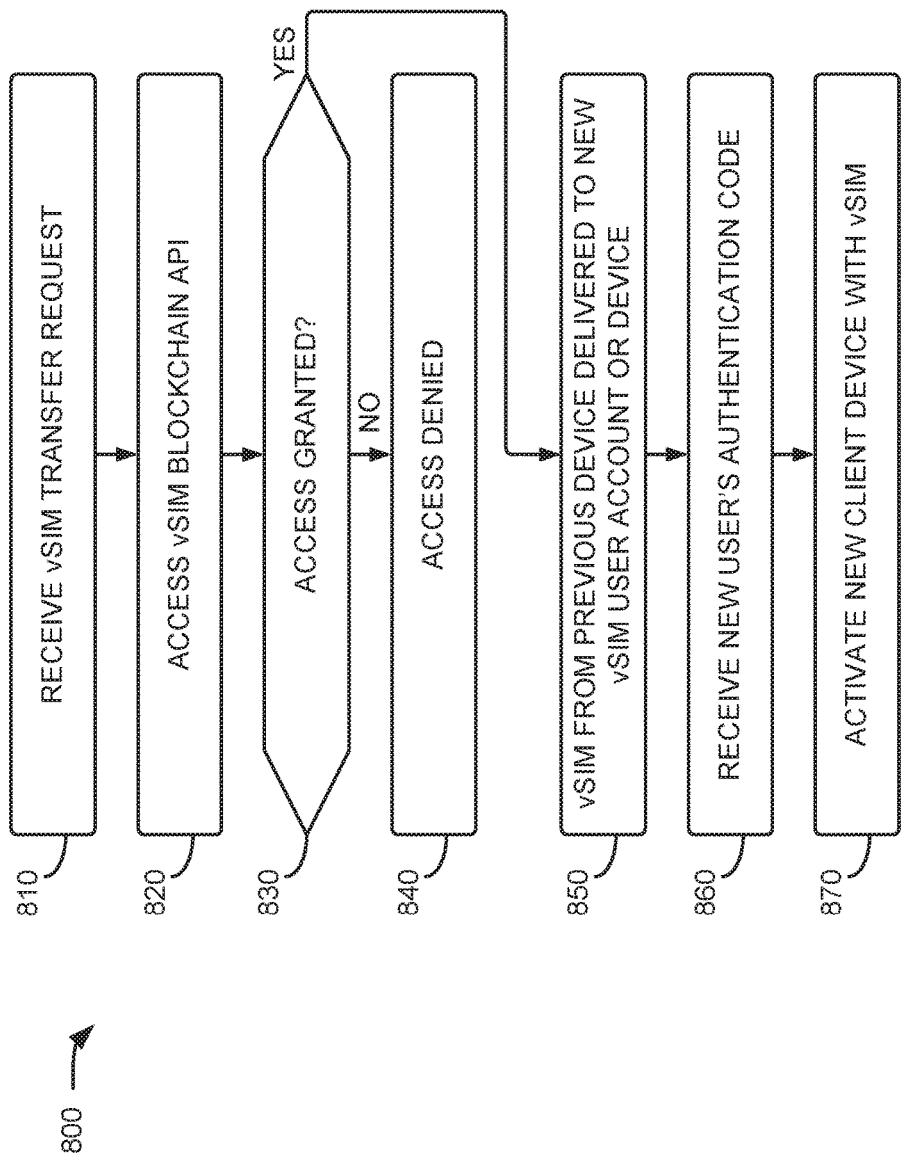
FIG. 8 is a flow diagram illustrating an exemplary process for transferring a vSIM, according to an implementation described herein.

FIG. 8 is a flow diagram illustrating an exemplary process 800 for process for transferring a vSIM consistent with embodiments described herein. Process 800 demonstrates how the vSIM can be transferred from one device/user to another device/user associated with the account. In one implementation, process 800 may be performed by vSIM platform 130. In another implementation, process 700 may be performed by vSIM platform 130 in conjunction with client devices 110-1 and 110-2.

Process 800 may include receiving a vSIM transfer request (block 810), accessing a vSIM blockchain (block 820), and determining if access is granted (block 830). For example, a user or client device 110 may initiate a vSIM transfer. In one embodiment, client device 110-1 may automatically submit a vSIM transfer request based on detecting another device or location. As another example, a user may initiate a vSIM transfer using client device 110-1. In another implementation, a user may use a web portal to initiate a vSIM transfer request. The vSIM transfer request may include, for example, a user's authentication code and a vSIM block identifier for the currently-assigned vSIM, and possibly a transfer recipient ID (e.g., a device ID or user ID) and transfer duration (e.g., an allocation period). vSIM platform 130 may receive the vSIM request with the authentication code and blockchain ID from client device 110-1. vSIM platform 130 may compare the authentication code received from client device 110-1 with the previously stored authentication code. vSIM platform 130 may verify through blockchain API interface 210 that the blockchain ID is available for transfer from the user's vSIM user account.

If access to the vSIM is not granted (block 830-NO), vSIM platform 130 denies the vSIM transfer request (block 840). For example, if the authentication code received from client device 110-1 does not match the authentication code stored by vSIM platform 130, or if the vSIM block ID is not the latest block in the blockchain, then vSIM platform 130 may deny access to transfer the vSIM.

If access to the vSIM is granted (block 830—YES), the vSIM may be transferred from the previous client device to a vSIM user account for the new client device or user (block 850). For example, if vSIM platform 130 determines that a user or client device 110-1 is authorized to transfer the vSIM, the vSIM may be associated with a vSIM user account for the new user/device.

Process 800 may include receiving the new user/device's authentication code (block 860) and activating the new client device with the vSIM (block 870). For example, the previous vSIM user may provide the blockchain ID to the new vSIM user/device. The new vSIM user/device may generate a vSIM access request with the blockchain ID. The new client device 110-2 may use a RAN (e.g., access network 170-1) to send the access request (e.g., an API call) to vSIM platform 130 requesting the vSIM. In one implementation, client device 110-2 may use a NAS control channel to send the API call. The API call may include the blockchain ID for the vSIM. In one implementation, as part of the API call, client device 110-2 may provide an authentication code (e.g., a passcode) solicited from user input or stored in a local memory (e.g., memory 330) of client device 110. Assuming the authentication code received from client device 110-2 matches an authentication code for the new user/device stored by vSIM platform 130, then vSIM platform 130 may transfer use rights, such as an IMSI detailed in the vSIM, to client device 110-2. With the transfer, vSIM platform 130 instructs blockchain API interface 210 to generate a new block for the vSIM blockchain. In some instances, the new block may include an allocation duration, as indicated in the original transfer request. In one implementation, a vSIM block identifier may be provided to client device 110-2. With the new blockchain entry, new client device 110-2 becomes the user of record and the previous client device 110-1 will no longer have access.

Figure 9:
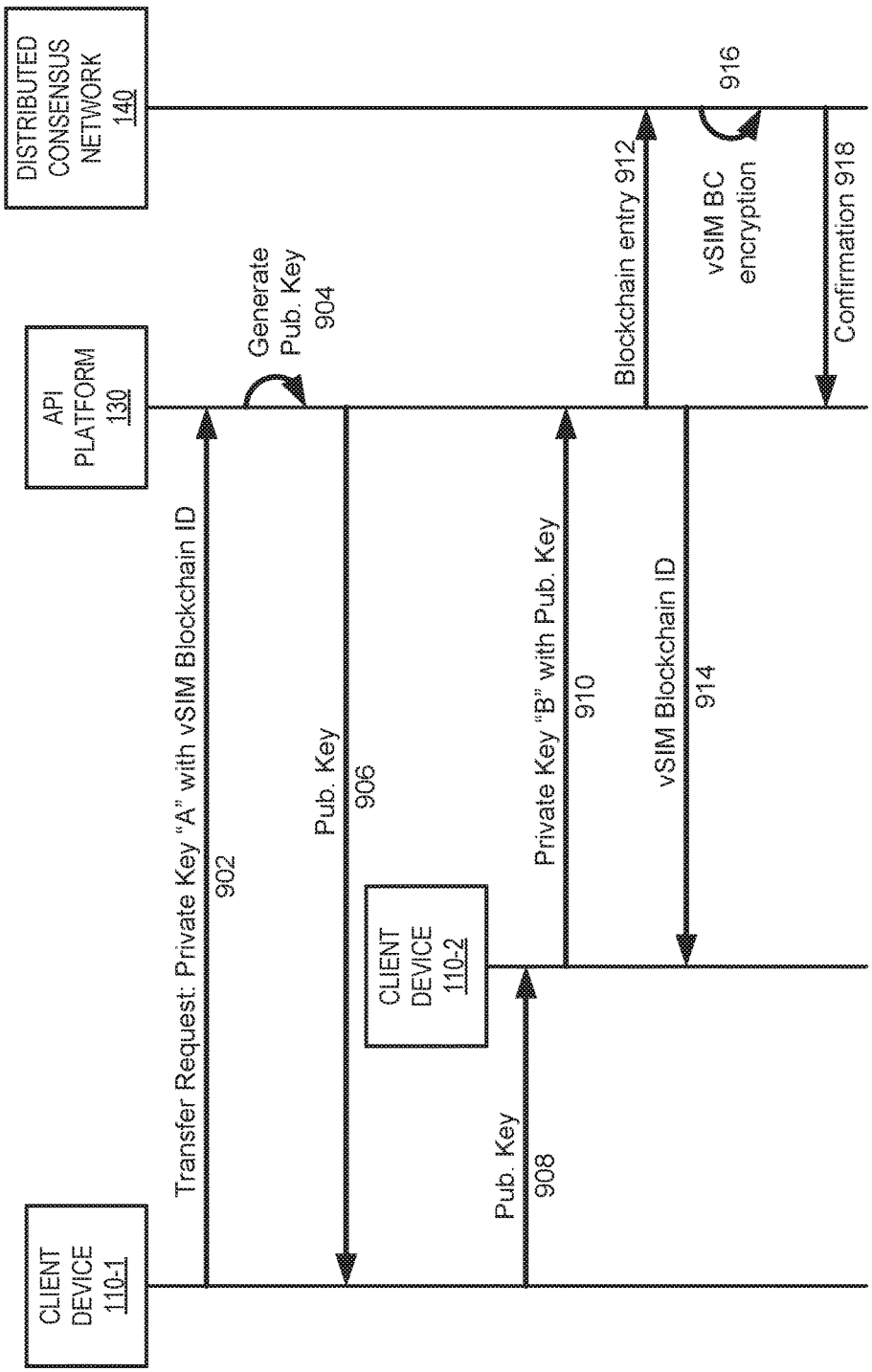
FIG. 9 is a diagram illustrating a use case for transferring a vSIM, according to implementations described herein.

FIG. 9 provides an illustration of a use case for transferring a vSIM, according to an implementation. In the example of FIG. 9, assume client device 110-1 is initially assigned a vSIM and that client device 110-2 has no SIM profile.

In response to instructions (e.g., from a user or an automatic trigger), client device 110-1 may initiate a transfer request for a vSIM currently associated with client device 110-1. The transfer request may be in the form of an API call. As shown in reference 902, the transfer request may include an authentication code for the user (e.g., private key "A") and a unique vSIM identifier (e.g., the vSIM blockchain ID). In response to the transfer request and as shown at reference 904, vSIM platform 130 may generate a public key to facilitate transfer of the vSIM. In one implementation, the public key may be derived using the authentication code. vSIM platform 130 may send the public key to client device 110-1, as shown at reference 906.

At reference 908, client device 110-1 may share the public key with client device 110-2 to prompt the vSIM transfer. The public key may be shared, for example, between client device 110-1 and client device 110-2 using a local wireless network connection (e.g., WI-FI, BLUETOOTH, NFC, etc.), a wired connection, or a manual transfer. As shown at reference 910, client device 110-2 may provide an API call with an authentication code for the new user/device (e.g., private key "B") and the public key. In response to the API call, vSIM platform 130 may submit a new blockchain entry to distributed consensus network 140 at reference 912, and provide an updated vSIM blockchain ID to client device 110-2 at reference 914.

As shown in reference 916, distributed consensus network 140 may perform blockchain encryption among service nodes 145 (not shown in FIG. 9). Assuming agreement among service nodes 145, distributed consensus network 140 may provide a confirmation (e.g., of successful blockchain entry) to vSIM platform 130 at reference 918).

Systems and methods described provide a secure decentralized information/password sharing system, using a blockchain encryption to create decentralized secure services for vSIMs. A wireless carrier can securely deliver vSIM via the API over the network to client devices. A client device accesses a user's vSIM user account to obtain vSIM before access to the network is allowed. Once a block (e.g., a vSIM certificate) is transferred to a user/device it is disabled for the previous user/device. Thus, a single vSIM may be shifted among multiple user device that may be used individually, such as a smartphone, a vehicle telecommunications system, a laptop/tablet computer, an IoT device, etc.

In contrast with physical SIMs, use of vSIMs enables virtualized mobile devices and pooling of mobile devices. For example, a user can buy or borrow a temporary vSIM that would allow access to other networks (international, guest access, etc.). As another example, a single client device may have vSIMs for different international and domestic carriers. Use of vSIMs may reduce costs of machine-type communication (MTC) devices, such as Internet of Things devices, where a tradition SIM may sometimes cost more than the MTC device itself. Use of vSIMs may also guarantees security of a user's device by enabling removal of the vSIM from a stolen device. Use of vSIMs may also eliminate spoofing, since use of blockchain encryption prevents creation/use of a fake SIM.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks and/or steps has been described with regard to the processes illustrated in FIGS. 6-8 and the example of FIG. 9, the order of the blocks/steps may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (such as a processor, an ASIC, or a FPGA) or a combination of hardware and software. The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such.

What is claimed is:

1. A method, comprising:
   creating, by a network device, a first user account for storing one or more virtual subscriber identity modules (vSIMs);

receiving, by the network device and from a user of the first user account, a selection of network services to be associated with a vSIM;

initiating, by the network device, creation of a blockchain including a vSIM certificate for the network services, wherein the vSIM certificate includes an International Mobile Subscriber Identity (IMSI);

associating, by the network device, the vSIM certificate with the first user account; and receiving, from a client device and via a radio access network (RAN), an application programming interface (API) call including a private authentication code and a query for the vSIM certificate.

2. The method of claim 1, further comprising:
verifying the private authentication code; and
activating the client device for network services based on the IMSI in the vSIM certificate.

3. The method of claim 2, further comprising:
after the verifying, providing instructions, to a node in a distributed consensus network, to update the blockchain.

4. The method of claim 2, further comprising:
receiving, from the client device, the private authentication code and a transfer request for the vSIM certificate; and
sending, to the client device, a public key for the blockchain.

5. The method of claim 4, further comprising:
transferring, by the network device and in response to the transfer request, the vSIM certificate to a second user account.

6. The method of claim 4, further comprising:
receiving, from another client device, an access request, the public key, and another private authentication code;
verifying the other private authentication code; and
activating the other client device for network services based on the IMSI in the vSIM certificate.

7. The method of claim 6, further comprising:
providing instructions to update the blockchain in response to the activating the other client device for network services; and
receiving confirmation from a node in a distributed consensus network of the updating the blockchain.

8. The method of claim 6, further comprising:
crediting, by the network device, the first user account in response to activating the other client device for network services.

9. The method of claim 1, wherein the API call is received via a Non-Access Stratum (NAS) control channel.

10. The method of claim 1, wherein further comprising:
comparing the authentication code received from client device with a previously stored authentication code; and
denying access to the vSIM when the authentication code does not match the previously stored authentication code.

11. A system, comprising:
a network device, the network device including a memory and a processor to execute instructions in the memory to:
create, in the memory, a first user account for storing one or more virtual subscriber identity modules (vSIMs);
receive, from a user of the first user account, a selection of network services to be associated with a vSIM;
initiate creation of a blockchain including a vSIM certificate for the network services, wherein the vSIM certificate includes an International Mobile Subscriber Identity (IMSI);
associate the vSIM certificate with the first user account;
receive, from a client device, a query for the vSIM certificate;
activate the client device for cellular network services based on the IMSI in the vSIM certificate; and
update the blockchain in response to activating the client device for cellular network services.

12. The system of claim 11, wherein, when receiving the query for the vSIM certificate, the network device is further to execute instructions in the memory to:
receive, from the client device, a private authentication code associated with the query for the vSIM certificate; and
verify the private authentication code.

13. The system of claim 12, wherein, when receiving the private authentication code, the network device is further to execute instructions in the memory to:
receive the private authentication code via an application programming interface (API) call submitted over a radio access network (RAN).

14. The system of claim 12, wherein, when receiving the private authentication code and the query for the vSIM certificate, the network device is further to execute instructions in the memory to:
receive the private authentication code and the query for the vSIM certificate via a Non-Access Stratum (NAS) control channel.

15. The system of claim 11, wherein the vSIM certificate further comprises a blockchain identifier for the vSIM.

16. The system of claim 15, wherein the network device is further to execute instructions in the memory to:
receive, from the client device, the blockchain identifier, the private authentication code, and a transfer request for the vSIM certificate; and
send, to the client device and in response to the transfer request, a public key for the blockchain.

17. The system of claim 11, further comprising:
the client device, wherein the client device does not include a physical subscriber identity module (SIM) card.

18. A non-transitory computer-readable medium storing instructions executable by a device to:
create, in a memory, a first user account for storing one or more virtual subscriber identity modules (vSIMs);
receive, from a user of the first user account, a selection of network services to be associated with a vSIM;
initiate creation of a blockchain including a vSIM certificate for the network services, wherein the vSIM certificate includes an International Mobile Subscriber Identity (IMSI);
associate the vSIM certificate with the first user account;
receive, from a client device, a query for the vSIM certificate;
activate the client device for cellular network services based on the IMSI in the vSIM certificate; and
update the blockchain in response to activating the client device for cellular network services.

19. The non-transitory computer-readable medium of claim 18, further comprising instructions to:
receive, from the client device, a private authentication code and a transfer request for the vSIM certificate;
send, to the client device, a public key for the blockchain;
receive, from another client device, an access request, the public key, and another private authentication code;

verify the other private authentication code; and
activate the other client device for cellular network services based on the IMSI in the vSIM certificate.

20. The non-transitory computer-readable medium of claim 18, further comprising instructions to:
receive the query for the vSIM certificate via a Non-Access Stratum (NAS) control channel.

* * * * *